(12) United States Patent
Chandrashekarappa et al.

(10) Patent No.: US 9,126,694 B2
(45) Date of Patent: Sep. 8, 2015

(54) DISPLAY SYSTEMS AND METHODS FOR PROVIDING DISPLAYS HAVING AN INTEGRATED AUTOPILOT FUNCTIONALITY

(71) Applicant: HONEYWELL INTERNATIONAL INC., Morristown, NJ (US)

(72) Inventors: Mohan Gowda Chandrashekarappa, Karnataka (IN); Babitha Jajur Shambulingappa, Karnataka (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 228 days.

(21) Appl. No.: 13/942,153

(22) Filed: Jul. 15, 2013

(65) Prior Publication Data

US 2015/0019047 A1    Jan. 15, 2015

(51) Int. Cl.
| | |
|---|---|
| *B64D 43/00* | (2006.01) |
| *B64C 19/00* | (2006.01) |
| *G01C 23/00* | (2006.01) |
| *G05D 1/10* | (2006.01) |
| *G06F 3/048* | (2013.01) |
| *G08G 5/00* | (2006.01) |

(52) U.S. Cl.
CPC ............... *B64D 43/00* (2013.01); *B64C 19/00* (2013.01); *G01C 23/005* (2013.01); *G05D 1/10* (2013.01); *G06F 3/048* (2013.01); *G08G 5/003* (2013.01)

(58) Field of Classification Search
CPC .......... B64D 43/00; G06F 3/048; G05D 1/10; G01C 23/005; B64C 19/00
See application file for complete search history.

(56) References Cited

U.S. PATENT DOCUMENTS

| | | | |
|---|---|---|---|
| 6,112,141 A | 8/2000 | Briffe et al. | |
| 7,970,502 B2 | 6/2011 | Boorman et al. | |

(Continued)

FOREIGN PATENT DOCUMENTS

EP       2136276 A2    12/2009

OTHER PUBLICATIONS

"Applicant amended claims Apr. 9, 2015"; Applicant amended claims Apr. 9, 2015.pdf; authored by: Ryan T. Fortin.*

(Continued)

*Primary Examiner* — James Trammell
*Assistant Examiner* — James E Stroud
(74) *Attorney, Agent, or Firm* — Ingrassia Fisher & Lorenz, P.C.

(57) ABSTRACT

A method for providing a display to a flight crew of an aircraft includes providing a horizontal navigation display that includes data regarding the movement of the aircraft in a horizontal direction and an aircraft icon indicating a position of the aircraft in the horizontal direction. The method further includes providing a vertical navigation display that includes data regarding the movement of the aircraft in a vertical direction and an aircraft icon indicating a position of the aircraft in the vertical direction. The horizontal and vertical navigation displays are disposed adjacent to one another on a single display device. The method further includes receiving a first input to the display device indicating a selection of the horizontal navigation display aircraft icon, and, in response to the selection of the horizontal navigation display aircraft icon, engaging a horizontal navigation control feature of an autopilot system of the aircraft.

15 Claims, 16 Drawing Sheets

(56) References Cited

U.S. PATENT DOCUMENTS

| | | | |
|---|---|---|---|
| 8,285,427 B2* | 10/2012 | Rogers et al. | 701/3 |
| 8,380,367 B2* | 2/2013 | Schultz et al. | 701/3 |
| 8,694,184 B1* | 4/2014 | Boorman et al. | 701/14 |
| 8,843,306 B1* | 9/2014 | Spackman et al. | 701/409 |
| 8,880,339 B1* | 11/2014 | Cooper et al. | 701/440 |
| 8,965,600 B2* | 2/2015 | Kolbe et al. | 701/3 |
| 2010/0131126 A1* | 5/2010 | He et al. | 701/14 |
| 2011/0118908 A1 | 5/2011 | Boorman et al. | |
| 2011/0137492 A1 | 6/2011 | Sahasrabudhe et al. | |
| 2013/0076540 A1 | 3/2013 | McLoughlin et al. | |
| 2013/0179009 A1 | 7/2013 | Gershzohn | |
| 2014/0245217 A1* | 8/2014 | Asahara | 715/781 |

OTHER PUBLICATIONS

EP Extended Search Report for Application No. 14174003.5 dated Dec. 4, 2014.

Avionics—The Smartest Jet in the Sky; For the Safest Flight Possible; Smart Touch Control.

Raytheon Anschutz; NautoPilot 5000 Series, Adaptive Heading Control System.

* cited by examiner

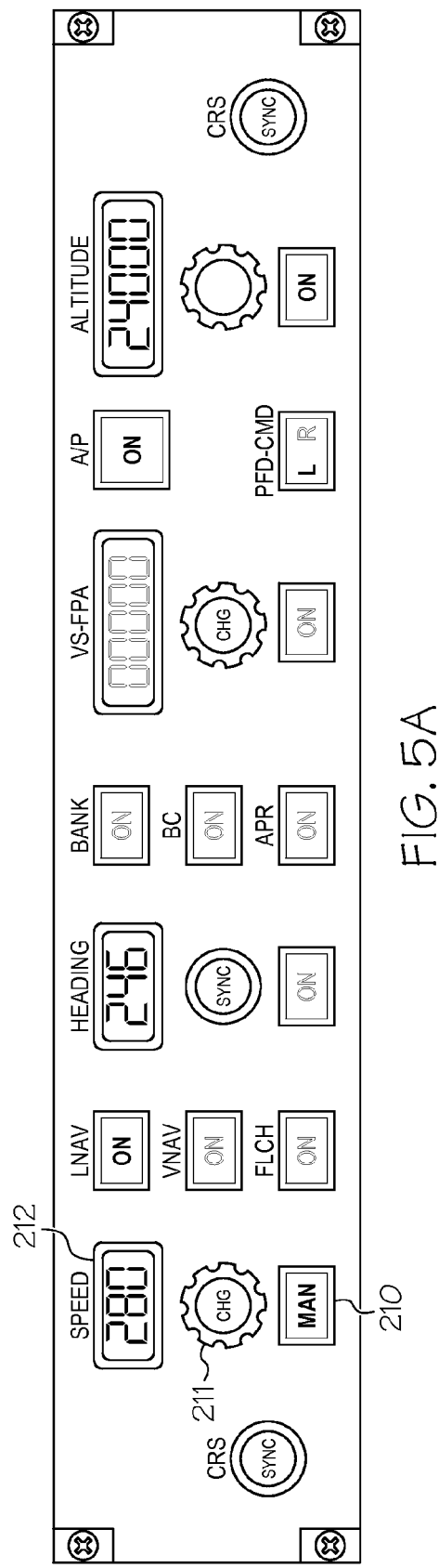

DISPLAY SYSTEMS AND METHODS FOR PROVIDING DISPLAYS HAVING AN INTEGRATED AUTOPILOT FUNCTIONALITY

TECHNICAL FIELD

The present disclosure generally relates to display systems, including aircraft display systems, and methods for providing displays. More particularly, the present disclosure relates to display systems and methods for providing displays having an integrated autopilot functionality.

BACKGROUND

Modern aircraft display systems are capable of displaying a considerable amount of information such as aircraft position, attitude, navigation, and terrain information. Most such displays additionally allow a flight plan to be displayed from different views, such as a perspective view or primary flight display, a vertical situation display, and/or a lateral situation display, which may be displayed individually or simultaneously. When displayed simultaneously, the display is often referred to as an interactive navigation display (INAV). The vertical situation display and the lateral situation display are two-dimensional views of the aircraft flight plan, and may include, for example, an aircraft symbol, waypoint symbols, line segments that interconnect the waypoint symbols, and/or range rings. These views may also include various map features including, for example, weather information, terrain information, political boundaries, and navigation aids.

The vertical situation display and lateral situation display may also provide a user interface that allows the pilot or co-pilot of the aircraft to monitor and/or change the flight plan and/or path. For example, the pilot or co-pilot may maneuver a cursor to select a waypoint symbol on one of these views, resulting in the creation of a pop-up menu. The pilot or co-pilot can then interact with various menus to view the details of, or modify, an existing waypoint. Further, the pilot or co-pilot is able to utilize the user interface to create additional waypoints. For example, the pilot or co-pilot might interact with a selectable menu on the second image to provide the information necessary (e.g., latitude, longitude, and altitude) to set the waypoint. A new waypoint symbol would then appear in the appropriate location on the second image. Alternatively, the pilot or co-pilot might maneuver the cursor to the desired location of the vertical situation display or the lateral situation display and provide an input (e.g., click a button) resulting in the generation of a pop-up menu. The pilot or co-pilot may then interact with various pop-up menus to create the new waypoint.

While the vertical situation display and the lateral situation display include functionalities that allow the pilot to change the flight plan, the pilot must still use a separate mode control panel (MCP) or guidance panel (GP) to change the auto-throttle (A/T) and autopilot (A/P) functions of the autopilot flight director system (AFDS). Thus, in order to change the course of an aircraft, a pilot is often required to use the vertical and/or lateral situation display to program a flight path change, followed by a separate input on the MCP or GP to make a corresponding command change to the A/T and/or A/P system. Thus, the pilot is often forced to divert his/her attention by having to look at and make inputs at multiple input sources along the flight control panel.

Accordingly, it is desirable to provide improved display systems and methods for providing displays that overcome the deficiencies in the prior art. It is further desirable to provide system integrations that will reduce the pilot dependency on multiple avionic systems and provide a more intuitive graphical manner of performing and controlling the various autopilot and autothrottle modes. Furthermore, other desirable features and characteristics of the present disclosure will become apparent from the subsequent detailed description of the inventive subject matter and the appended claims, taken in conjunction with the accompanying drawings and this background of the inventive subject matter.

BRIEF SUMMARY

Display systems and methods for providing displays are disclosed. In one exemplary embodiment, a method for providing a display to a flight crew of an aircraft includes providing a horizontal navigation display that includes data regarding the movement of the aircraft in a horizontal direction, a virtual compass including an aircraft heading indicator indicating a current heading of the aircraft and an autopilot heading selector, and an aircraft icon indicating a position of the aircraft in the horizontal direction. The method further includes providing a vertical navigation display that includes data regarding the movement of the aircraft in a vertical direction, an altitude target indicator line, and an aircraft icon indicating a position of the aircraft in the vertical direction. The horizontal and vertical navigation displays are disposed adjacent to one another on a single display device. The method further includes receiving a first input to the display device indicating a selection of the horizontal navigation display aircraft icon, and, in response to the selection of the horizontal navigation display aircraft icon, engaging a horizontal navigation control feature of an autopilot system of the aircraft. The method further includes receiving a second input to the display device indicating a selection of the vertical navigation display aircraft icon, and, in response to the selection of the vertical navigation display aircraft icon, engaging a vertical navigation control feature of the autopilot system of the aircraft. The method further includes receiving a third input to the display device indicating a selection of the autopilot heading selector, the third input including a movement of the autopilot heading selector along the virtual compass to a desired heading, and, in response to the movement of the autopilot heading selector, actuating a flight heading control system of the horizontal navigation control feature to cause the aircraft to fly at the desired heading. Still further, the method includes receiving a fourth input to the display device indicating a selection of the altitude target indicator line, the fourth input including a movement of the altitude target indicator line in either an up or a down vertical direction to indicate a desired altitude, and, in response to the movement of the altitude target indicator line, actuating an altitude control system of the vertical navigation control feature to cause the aircraft to fly at the desired altitude.

In another exemplary embodiment, a display system configured to provide a display to a flight crew of an aircraft includes an image display device, a cursor control device in operable electronic communication with the image display device, a data storage device that stores navigation information and runway information, and a computer processor device in operable electronic communication with the image display device and the data storage device. The computer processor device is configured to provide a horizontal navigation display that includes data regarding the movement of the aircraft in a horizontal direction, a virtual compass comprising an aircraft heading indicator indicating a current heading of the aircraft and an autopilot heading selector, and an aircraft icon indicating a position of the aircraft in the horizontal direction. The computer processor device is further configured to provide a vertical navigation display that includes data regarding the movement of the aircraft in a vertical direction, an altitude target indicator line, and an aircraft icon indicating a position of the aircraft in the vertical direction. The horizontal and vertical navigation displays are disposed adjacent to one another on a single display device. The computer processor device is further configured to receive a first input to the display device indicating a selection of the horizontal navigation display aircraft icon, and, in response to the selection of the horizontal navigation display aircraft icon, engage a horizontal navigation control feature of an autopilot system of the aircraft. The computer processor device is further configured to receive a second input to the display device indicating a selection of the vertical navigation display aircraft icon, and, in response to the selection of the vertical navigation display aircraft icon, engage a vertical navigation control feature of the autopilot system of the aircraft. The computer processor device is further configured to receive a third input to the display device indicating a selection of the autopilot heading selector, the third input including a movement of the autopilot heading selector along the virtual compass to a desired heading, and, in response to the movement of the autopilot heading selector, actuate a flight heading control system of the horizontal navigation control feature to cause the aircraft to fly at the desired heading. Still further, the computer processor device is configured to receive a fourth input to the display device indicating a selection of the altitude target indicator line, the fourth input including a movement of the altitude target indicator line in either an up or a down vertical direction to indicate a desired altitude, and, in response to the movement of the altitude target indicator line, actuate an altitude control system of the vertical navigation control feature to cause the aircraft to fly at the desired altitude.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein:

FIGS. 5A and 5B illustrate airspeed control functionalities integrated into the flight display system shown in FIG. 1;

DETAILED DESCRIPTION

Figure 1:
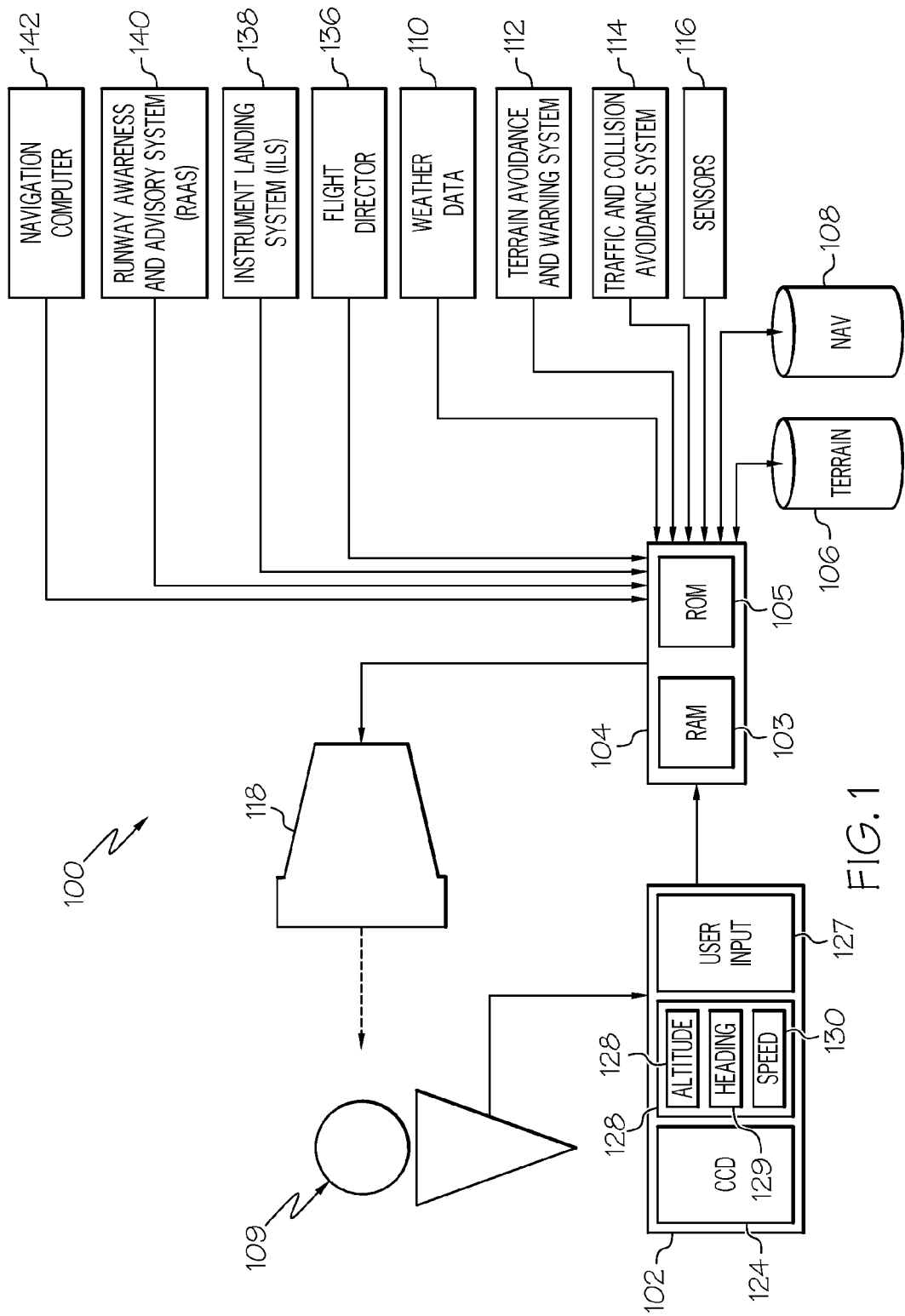
FIG. 1 is a block diagram of an exemplary flight display system in accordance with various embodiments of the present disclosure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Embodiments of the present disclosure provide an enhancement to known INAV display systems that allow the pilot to perform and control most of the A/P and A/T modes, which currently performed through the MCP or GP, directly on the INAV display system. The described embodiments thus allow the pilot to control the A/P and A/T mode control panel operations on a graphical user interface. This also allows the pilot to concentrate on a single integrated navigation display to deduce information and control the current autopilot modes without diverting her concentration by having to look out for information from multiple sources.

The present disclosure may be described in terms of functional block diagrams and various processing steps. It should be appreciated that such functional blocks may be realized in many different forms of hardware, firmware, and/or software components configured to perform the various functions. For example, the present disclosure may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing, figures, or the specification are not to be construed as limiting the order in which the individual processing steps may be performed. It should be appreciated that the particular implementations shown and described herein are illustrative of exemplary embodiments and are not intended to otherwise limit the scope of the disclosure in any way.

Turning now to the description, and with reference to FIG. 1, an exemplary display system 100 for a vehicle will be described. As used herein, the term "vehicle" refers to any type of vehicle that is configured to travel above a terrain, such as a manned or unmanned aircraft, rocket, missile, space vehicle, or a submerged vessel. The embodiment described herein will be with regard to an aircraft that is flying over a terrain, but it will be understood by one who is skilled in the art that embodiments of the present disclosure may also be used in connection with other vehicles. The display system 100 includes a user interface 102, a processor 104, one or more terrain databases 106, one or more navigation databases 108, a source of weather data 110, a terrain avoidance and warning system (TAWS) 112, a traffic and collision avoidance system (TCAS) 114, various sensors 116, and at least one electronic display 118.

The user interface 102 is in operable communication with the processor 104 and is configured to receive input from a user 120 (e.g., a pilot or a co-pilot) and, in response, to supply command signals to the processor 104. The user interface 102 includes a cursor control device (CCD) 124, a secondary interface 126, and additional user input interface 127. The CCD 124 may be any one, or a combination, of various known cursor control devices, including, but not limited to, a trackball, a joystick, and/or one or more buttons, switches, or knobs. As described further below, the CCD 124 supplies command signals to the processor 104 for controlling the movement of at least one movable cursor on the at least one electronic display 118.

The secondary interface 126 includes a plurality of controls for providing command signals to the processor 104 regarding the position and other characteristics of a cursor on the at least one electronic display 118. In the illustrated embodiment, the secondary interface 126 includes an altitude control 128, a heading control 129, and a speed control 130. These controls 128-130 are integrated with the electronic display, and are each described in greater detail below. The secondary interface 126 is combined with the CCD 124 such that the functions of the secondary interface 126 may be controlled in association with the CCD 124. For example, in one embodiment, the altitude, heading, and speed controls 128-130 are combined with one or more controls on the electronic display that the pilot 120 uses to provide input to the flight director (described below) regarding the desired altitude, heading, or speed of the aircraft. In this embodiment, a separate guidance panel or mode control panel may or may not be provided.

The processor 104 is in operable communication with the terrain databases 106, the navigation databases 108, and the at least one electronic display 118, and is coupled to receive various types of inertial data from the various sensors 116, and various other avionics-related data from one or more other external systems, which are briefly described further below. The processor 104 is configured, in response to the inertial data, to selectively retrieve terrain data from one or more of the terrain databases 106 and navigation data from one or more of the navigation databases 108, and to supply appropriate display commands to the at least one electronic display 118, so that the retrieved terrain and navigation data are appropriately displayed on the at least one electronic display 118. As FIG. 1 additionally shows, the processor 104 is also in operable communication with the source of weather data 110, the TAWS 112, the TCAS 114, and is additionally configured to supply appropriate display commands to the at least one electronic display 118 so that the avionics data, weather data 110, data from the TAWS 112, data from the TCAS 114, and data from the previously mentioned external systems may also be selectively displayed on the electronic display 118.

The processor 104 may be any one of numerous known general-purpose microprocessors or an application specific processor that operates in response to program instructions. In the depicted embodiment, the processor 104 includes on-board RAM (random access memory) 132 and on-board ROM (read only memory) 134, and/or other non-transitory data storage devices. The program instructions that control the processor 104 may be stored in either or both the RAM 132 and the ROM 134. For example, the operating system software may be stored in the ROM 134, whereas various operating mode software routines and various operational parameters may be stored in the RAM 132. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The terrain databases 106 include various types of data, including elevation data, representative of the terrain over which the aircraft is flying, and the navigation databases 108 include various types of navigation-related data. This navigation-related data includes various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the on-board RAM 132, or integrally formed as part of the processor 104, and/or RAM 132, and/or ROM 134. The terrain databases 106 and navigation databases 108 could also be part of a device or system that is physically separate from the display system 100.

The avionics data that is supplied from the sensors 116 includes data representative of the state of the aircraft such as, for example, aircraft speed, altitude, and heading. The weather data 110 supplied to the processor 104 is representative of at least the location and type of various weather cells. The data supplied from the TCAS 114 includes data representative of other aircraft in the vicinity, which may include, for example, speed, direction, altitude, and altitude trend. In a preferred embodiment, the processor 104, in response to the TCAS data, supplies appropriate display commands to the at least one electronic display 118 such that a graphic representation of each aircraft in the vicinity is displayed on the at least one electronic display 118. The TAWS 112 supplies data representative of the location of terrain that may be a threat to the aircraft. The processor 104, in response to the TAWS data, preferably supplies appropriate display commands to the at least one electronic display 118 such that the potential threat terrain is displayed in various colors depending on the level of threat.

As was previously alluded to, one or more other external systems (or subsystems) may also provide avionics-related data to the processor 104 for display on the electronic display 118. In the depicted embodiment, these external systems include a flight director 136, an instrument landing system (ILS) 138, a runway awareness and advisory system (RAAS) 140, and a navigation computer 142. The flight director 136, as is generally known, supplies command data representative of commands for piloting the aircraft in response to flight crew entered data, or various inertial and avionics data received from external systems. For example, as previously mentioned, the pilot 120 may utilize the electronic display 118 and CCD 124 to provide input regarding the desired speed, altitude, and/or heading of the aircraft, in place of the conventional guidance panel or mode control panel. In response, the flight director 136 supplies command data that is representative of that user input. The command data supplied by the flight director 136 may be supplied to the processor 104 and displayed on the at least one electronic display 118 for use by the pilot 120 and the data may further be supplied to an autopilot and autothrottle (not illustrated). The autopilot and autothrottle, in turn, produce appropriate control signals which are applied to the aircraft's flight control surfaces to cause the aircraft to fly in accordance with the flight crew entered data, or the inertial and avionics data.

The ILS 138 is a radio navigation system that provides aircraft with horizontal and vertical guidance just before and during landing and, at certain fixed points, indicates the distance to the reference point of landing. The system includes ground-based transmitters (not illustrated) that transmit radio frequency signals. The ILS 138 on board the aircraft receives these signals and supplies appropriate data to the processor for display of, for example, an ILS feather (not illustrated in FIG. 1) on the electronic display 118. The ILS feather represents two signals, a localizer signal that is used to provide lateral guidance, and a glide slope signal that is used for vertical guidance.

The RAAS 140 provides improved situational awareness to help lower the probability of runway incursions by providing timely aural advisories to the flight crew during taxi, takeoff, final approach, landing and rollout. The RAAS 140 uses GPS data to determine aircraft position and compares aircraft position to airport location data stored in the navigation database 108. Based on these comparisons, the RAAS 140, if necessary, issues appropriate aural advisories. The aural advisories the RAAS 140 may issue inform the pilot 120, among other things of when the aircraft is approaching a runway—either on the ground or from the air, when the aircraft has entered and is aligned with a runway, when the runway is not long enough for the particular aircraft, the distance remaining to the end of the runway as the aircraft is landing or during a rejected takeoff, when the pilot 120 inadvertently begins to take off from a taxiway, and when an aircraft has been immobile on a runway for an extended time.

The navigation computer 142 is used, among other things, to allow the pilot 120 to program a flight plan from one destination to another. The navigation computer 142 may be in operable communication with the flight director 136. As was mentioned above, the flight director 136 may be used to automatically fly, or assist the pilot 120 in flying, the programmed route. The navigation computer 142 is in operable communication with various databases including, for example, the terrain database 106, and the navigation database 108. The processor 104 may receive the programmed flight plan data from the navigation computer 142 and cause programmed flight plan, or at least portions thereof, to be displayed on the electronic display 118.

The electronic display 118 is used to display various images and data, in both a graphical and a textual format, and to supply visual feedback to the pilot 120 in response to the user input commands supplied by the pilot 120 to the user interface 102. It will be appreciated that the at least one electronic display 118 may be any one of numerous known displays suitable for rendering image and/or text data in a format viewable by the pilot 120. Non-limiting examples of such displays include various cathode ray tube (CRT) displays, and various flat panel displays such as, various types of LCD (liquid crystal display) and TFT (thin film transistor) displays. The display may additionally be based on a panel mounted display, a HUD projection, or any known technology. In an exemplary embodiment, the at least one electronic display 118 includes a panel display.

FIGS. 2-7 illustrate various aspects of the electronic display 118 that incorporates the functionalities of a conventional GP or MCP.

Vertical and Lateral Navigation Controls

Figure 2A:
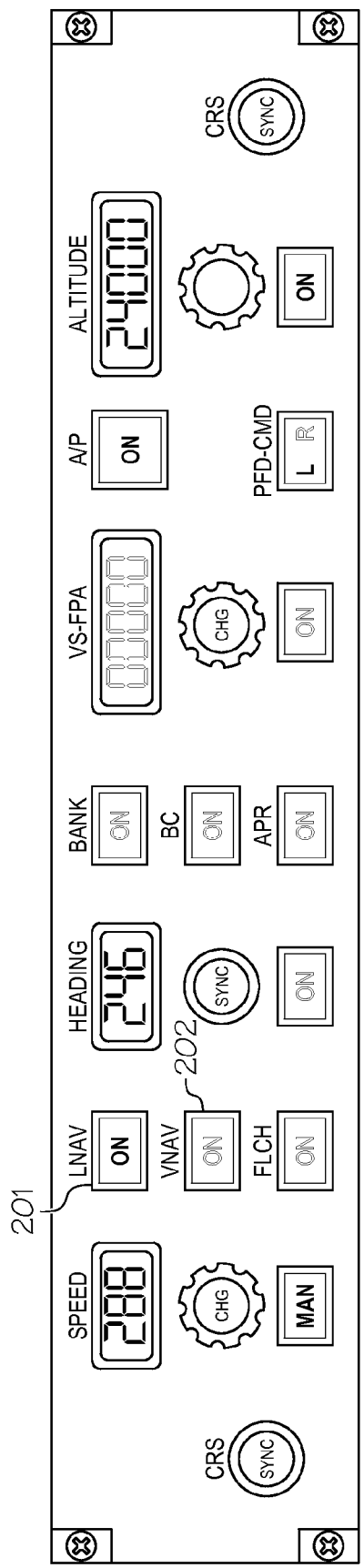
FIGS. 2A and 2B illustrate lateral and vertical navigation control functionalities integrated into the flight display system shown in FIG. 1.

FIG. 2A illustrates a conventional mode control panel that includes a lateral navigation (LNAV) button 201 and a vertical navigation (VNAV) button 202. The LNAV button 201 is used to select and deselect the lateral navigation mode. LNAV is responsible for the lateral path of the aircraft. In LNAV, the FMS guidance component uses the data from the performance and navigation components to calculate the necessary maneuvers (thrust and roll) to maintain the lateral path. The VNAV button is used to select and deselect the vertical navigation mode. VNAV is responsible for the vertical path of the aircraft. In VNAV, the FMS guidance component uses the data from the navigation and performance components to calculate the necessary maneuvers (thrust and pitch) in order to maintain the vertical path while meeting any crossing restrictions.

Figure 2B:
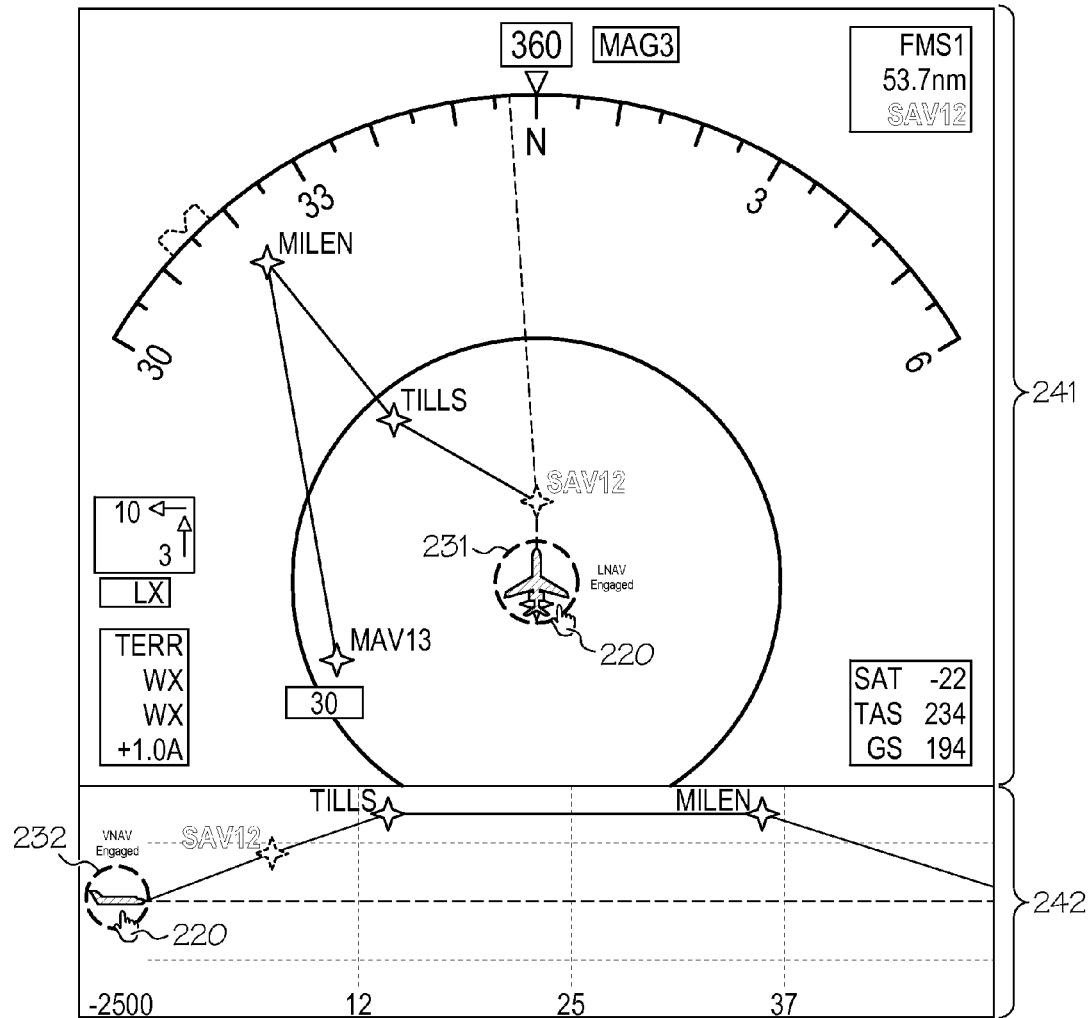

FIG. 2B illustrates an LNAV and VNAV functionality integrated into an interactive navigation (INAV) display in accordance with various embodiments of the present disclosure. As shown therein, the INAV display is separated into an LNAV portion 241 and a VNAV portion 242. The LNAV portion 241 includes an airplane symbol 231 that acts as a virtual button and a cursor control 220 that may be used to select and de-select the virtual button 231 to engage and disengage LNAV. Likewise, VNAV portion 242 includes an airplane symbol 232 that acts as a virtual button and a cursor control 220 that may be used to select and de-select the virtual button 232 to engage and disengage VNAV. The engagement status can be indicated by displaying a different and/or brighter color for the airplane symbols 231 and 232, or any other suitable visual indication (e.g., a change in size, a change in shape, etc.). In this manner, the functionality of buttons 201 and 202 shown in FIG. 2A are integrated into the display shown in FIG. 2B.

Heading Dial, Heading Select, and Heading Sync Controls

Figure 3A:
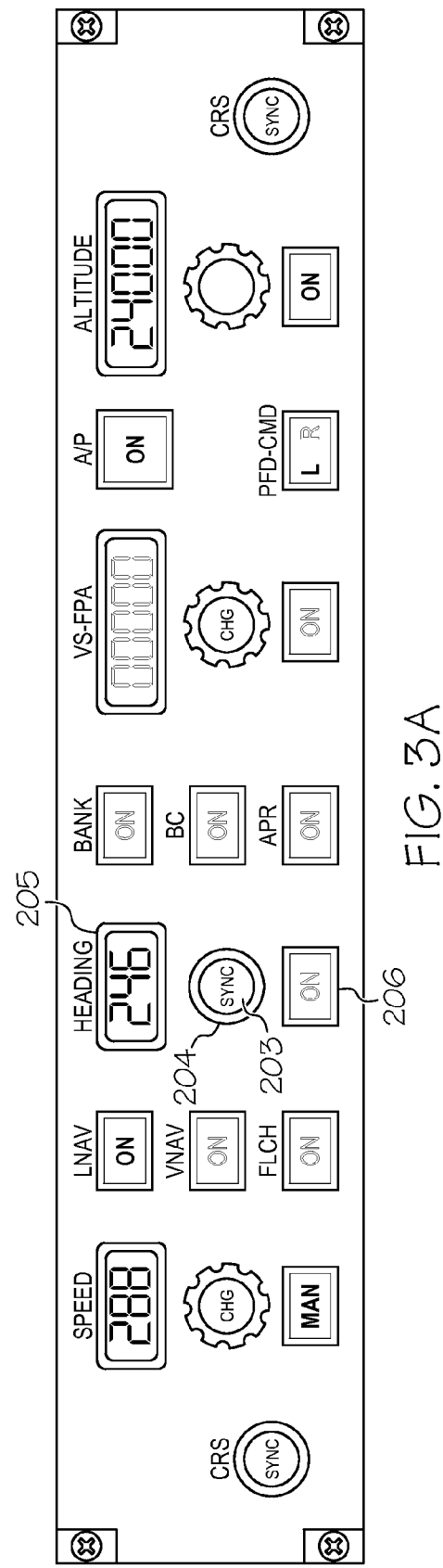
FIGS. 3A, 3B, and 3C illustrate heading selection control functionalities integrated into the flight display system shown in FIG. 1.

FIG. 3A illustrates a conventional mode control panel that includes a heading sync button 203, a heading dial knob 204, a heading indicator window 205, and a heading select button 206. The heading dial knob 204 is used to set the heading value. The selected heading is displayed in the HEADING indicator window 205, and the heading "bug" on the display is changed to indicate the selected heading. The sync button 203, incorporated in the knob 204, syncs the heading bug to the current aircraft heading. When the heading select button 206 is pushed and it annunciates ON, the heading select function is engaged. Simultaneously, LNAV disengages and the airplane controls to the selected heading.

Figure 3B:
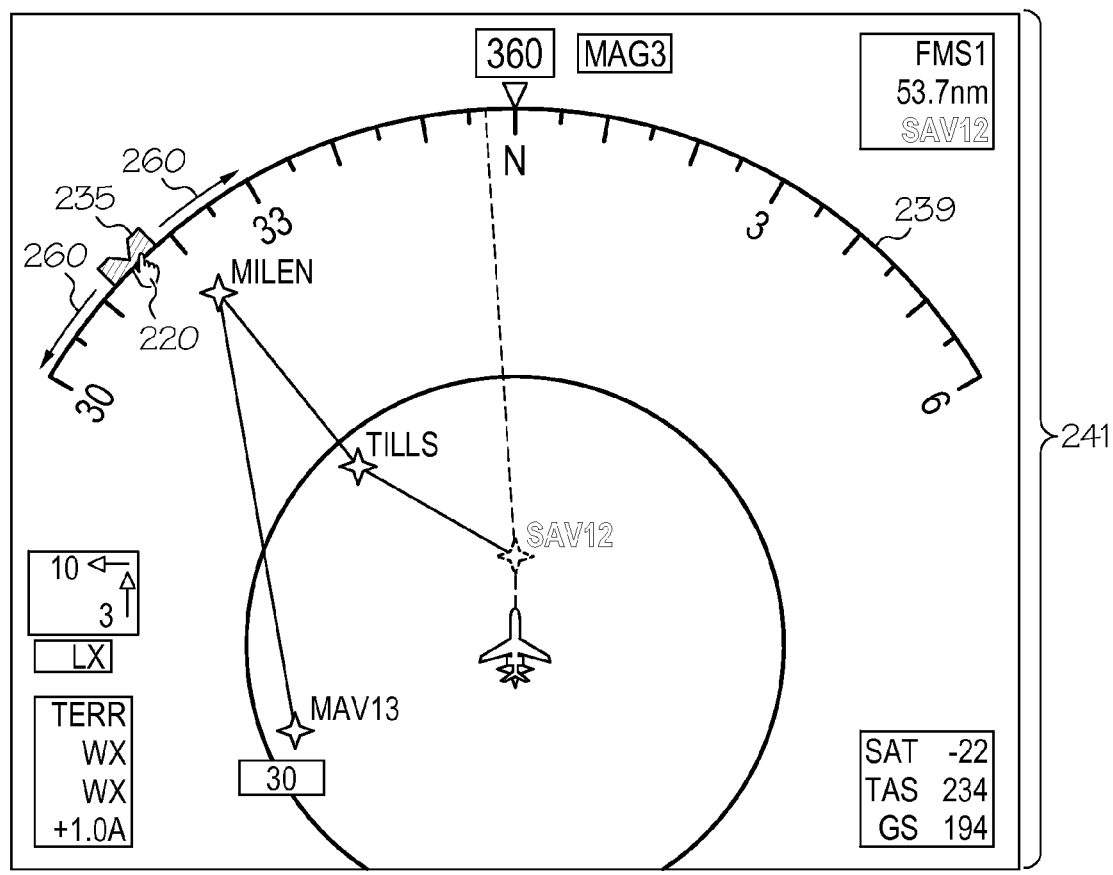
Figure 3C:
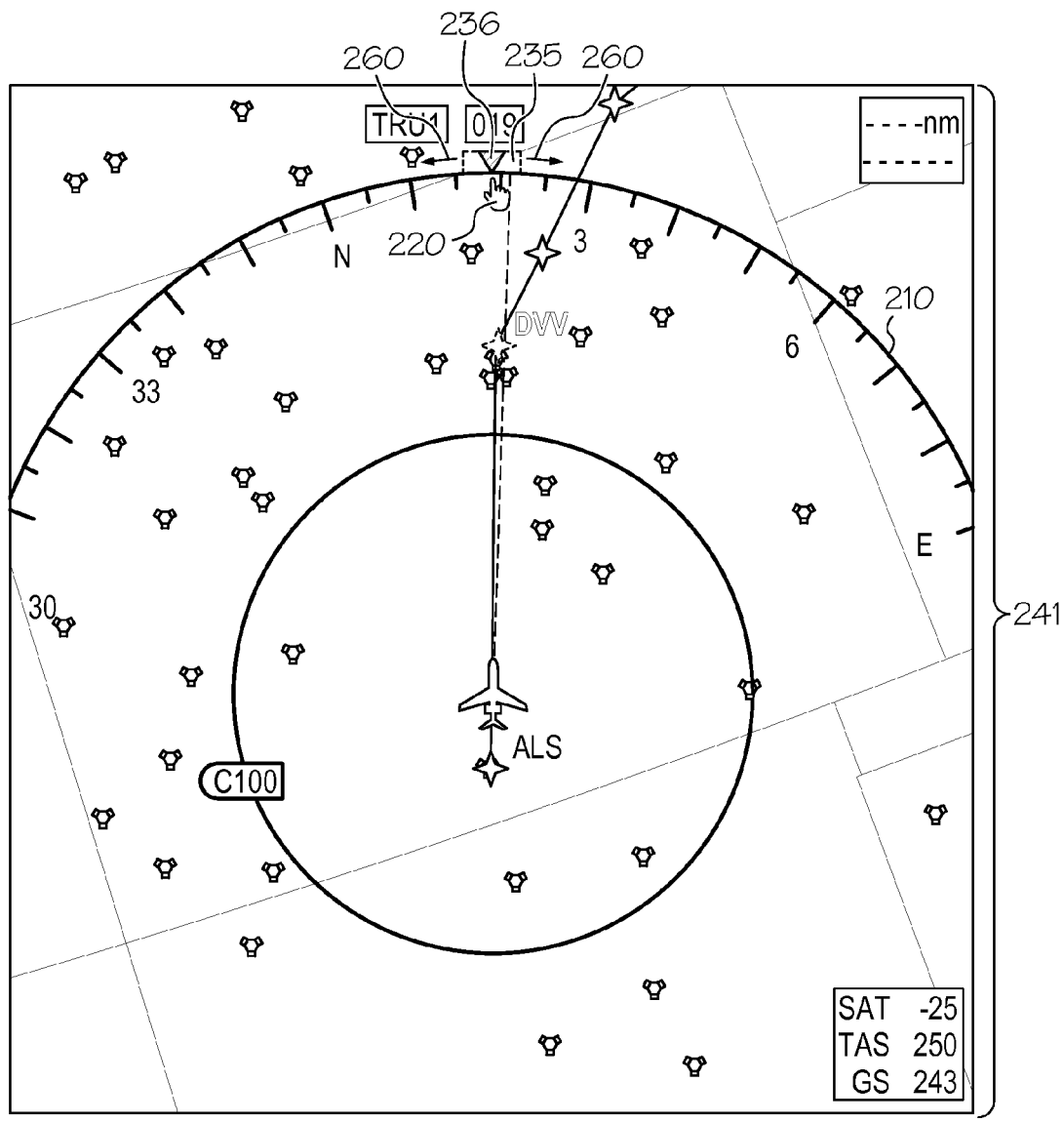

FIG. 3B illustrates a heading select and sync functionality integrated into an NAV display in accordance with various embodiments of the present disclosure. As shown therein, the heading bug 235 on the LNAV display 241 may function as a virtual button and control in conjunction with the cursor control 220 for heading dial and heading select functionalities. The bug 235 may be moved along the virtual compass 239 circle, as indicated by arrows 260, to dial a specific heading, and pushing the button (bug 235) will cause the heading mode to be selected. Heading select status can be indicated by choosing a different/brighter color for the heading bug 235, or any other suitable visual indication (e.g., a change in size, a change in shape, etc.). Further, as shown in FIG. 3C, the current heading marker 236 may function as a virtual button and may be used for the heading sync function to move the heading bug to align with the current airplane heading.

Vertical Speed and Flight Path Angle Controls

Figure 4A:
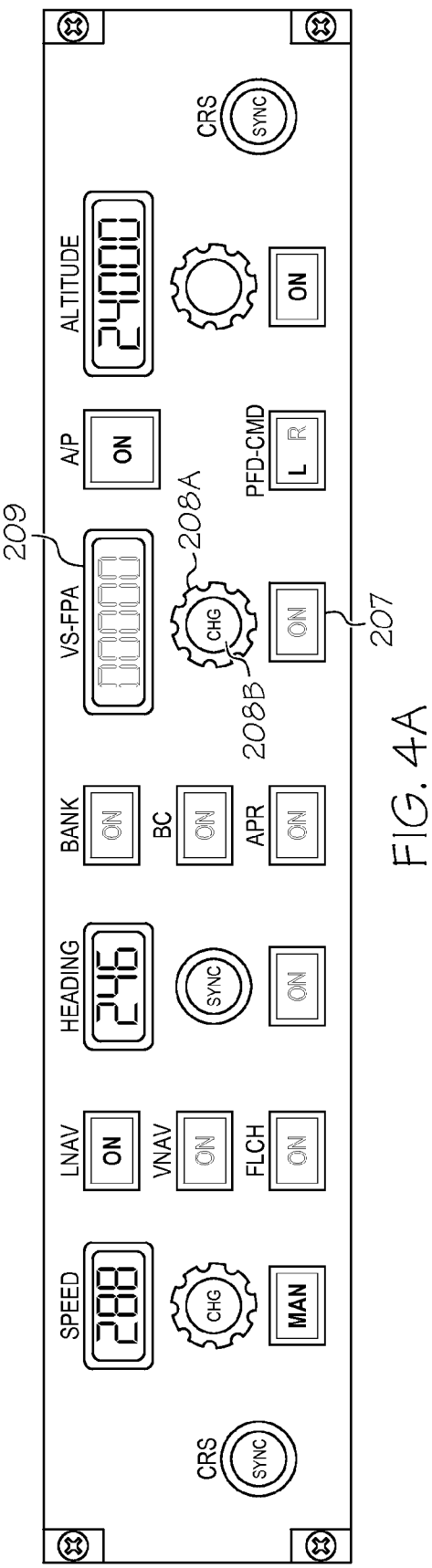
FIGS. 4A, 4B, and 4C illustrate vertical speed and flight path angle control functionalities integrated into the flight display system shown in FIG. 1.

FIG. 4A illustrates a conventional mode control panel that includes a vertical speed/flight path angle (VS-FPA) control button 207, a VS-FPA dial knob 208A, a mode change button 208B, and a VS-FPA indicator window 209. The VS-FPA function is used to control both the VS and FPA modes. The VS and FPA modes are mutually exclusive. The VS mode is entered pushing the mode change button 208B while in the FPA mode, and vice. The VS-FPA indicator window 209 value may be changed by rotating the VS-FPA dial knob 208A. VS is displayed in units of feet per minute. The FPA mode is entered by pushing the mode change button 208B while in the VS mode. Once the FPA mode is entered, the window 209 value can be changed using the VS-FPA dial knob 208A. FPA is displayed in units of degrees and is limited to ±9.9°.

Figure 4B:
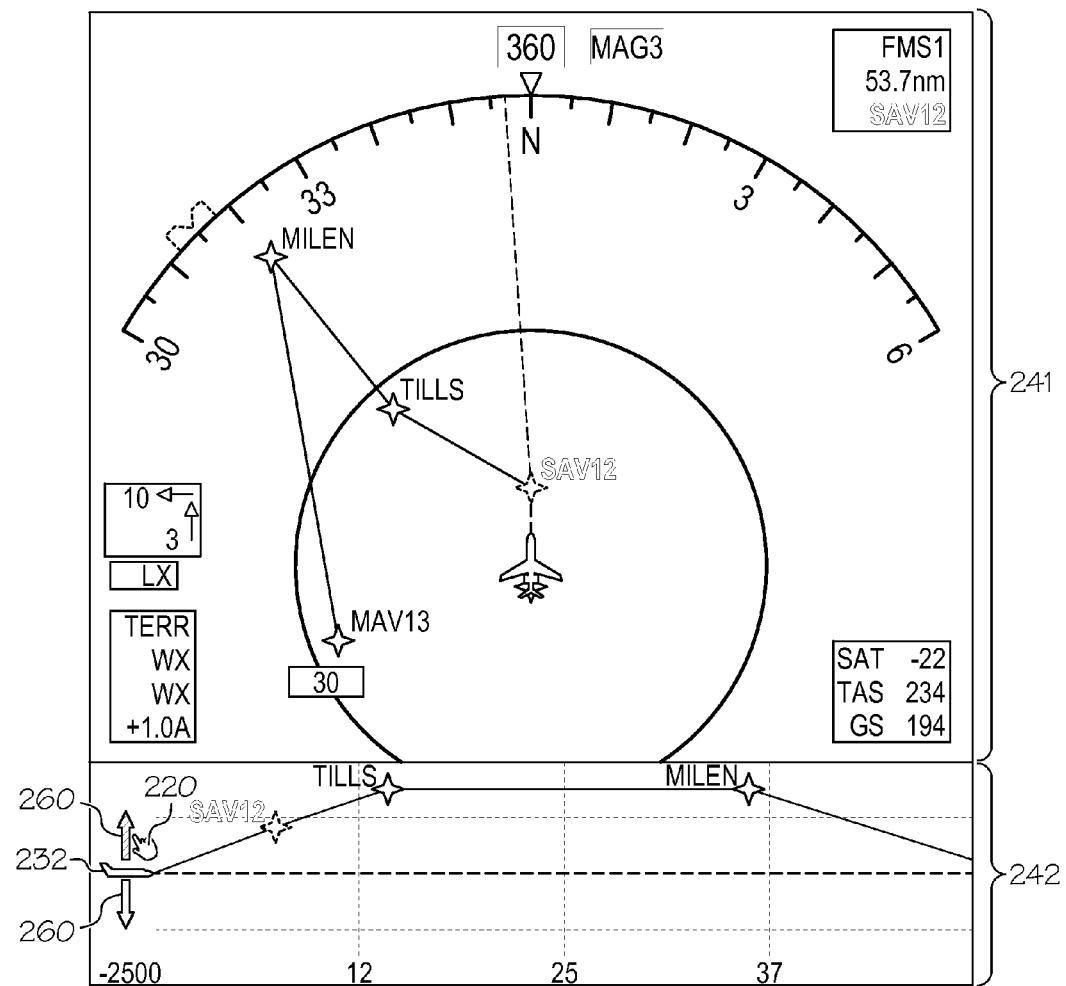
Figure 4C:
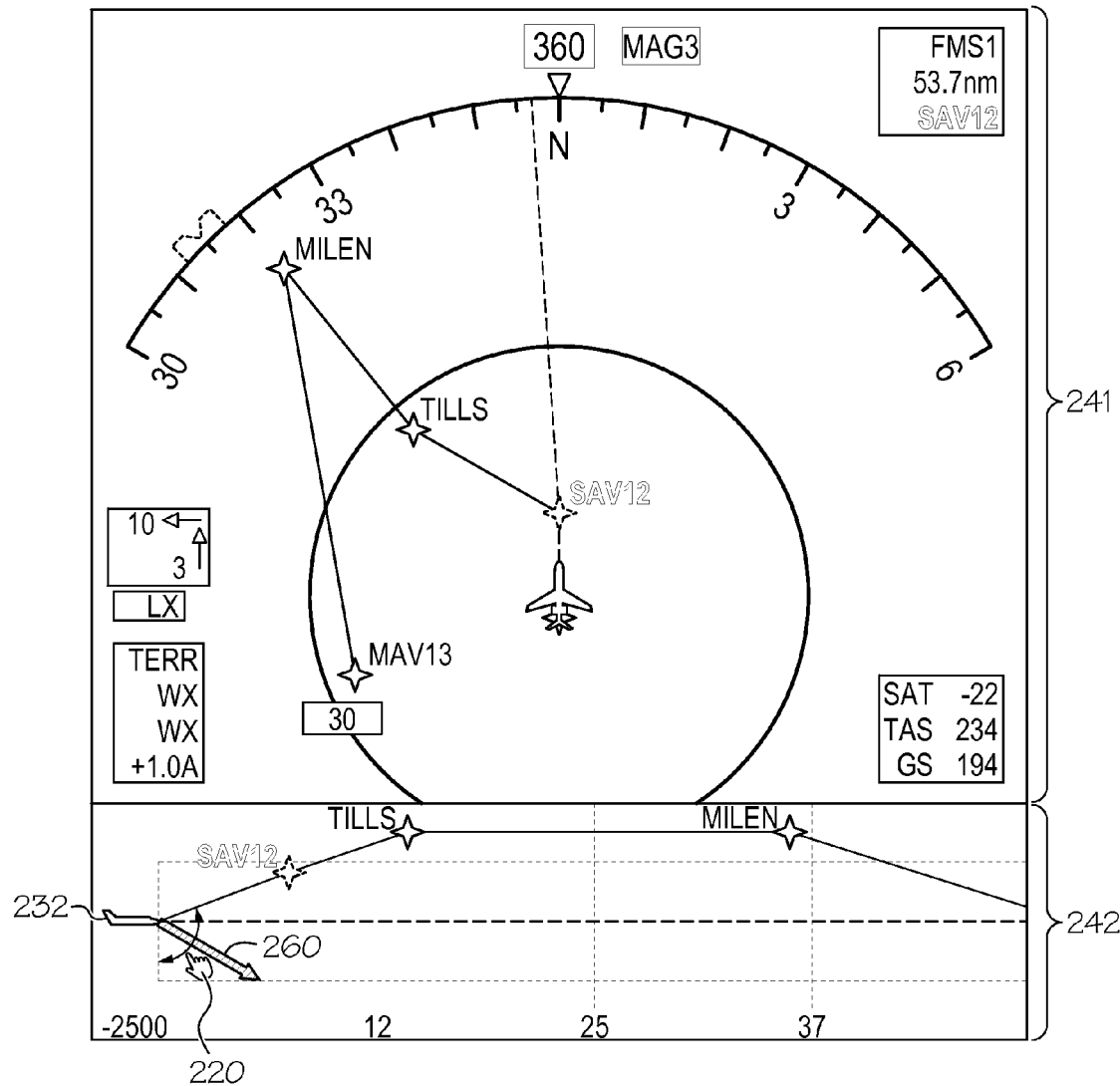

FIG. 4B illustrates a VS-FPA functionality integrated into an INAV display in accordance with various embodiments of the present disclosure. As shown therein, the airplane symbol 232 on the vertical navigation display 242 may function as a virtual button in conjunction with the cursor control 220. Dragging the airplane symbol 232 up or down will bring up a virtual arrow 260 that may be used to increase or decrease the VS by pulling it above or below the current airplane position, respectively. The value of increasing or decreasing VS may be displayed above or below the arrow 260. A brighter color for the arrow button 260 may be used to indicate that the VS is selected, or any other suitable visual indication (e.g., a change in size, a change in shape, etc.). Further, as shown in FIG. 4C, the same virtual arrow 260 centered at the nose of the airplane 232 and rotating in a semi-circular plane in front of the airplane 232 may be used to control the FPA. Changing between VS and FPA modes may be accomplished by successive selection of the airplane button 232.

Airspeed Controls

FIG. 5A illustrates a conventional mode control panel that includes an autothrottle (A/T) control button 210, an airspeed dial knob 211, and an airspeed indicator window 212. When the control button 210 is pushed, and the manual (MAN) annunciator in the button lights, the pilot can manually input an airspeed target, using the airspeed dial knob 211A. The selected speed is displayed in the airspeed indicator window 212. The speed values are used for the VNAV functionality and all A/T operations. The FMS automatically displays the speed value in the window 212 when the control button 210 is not selected.

Figure 5B:
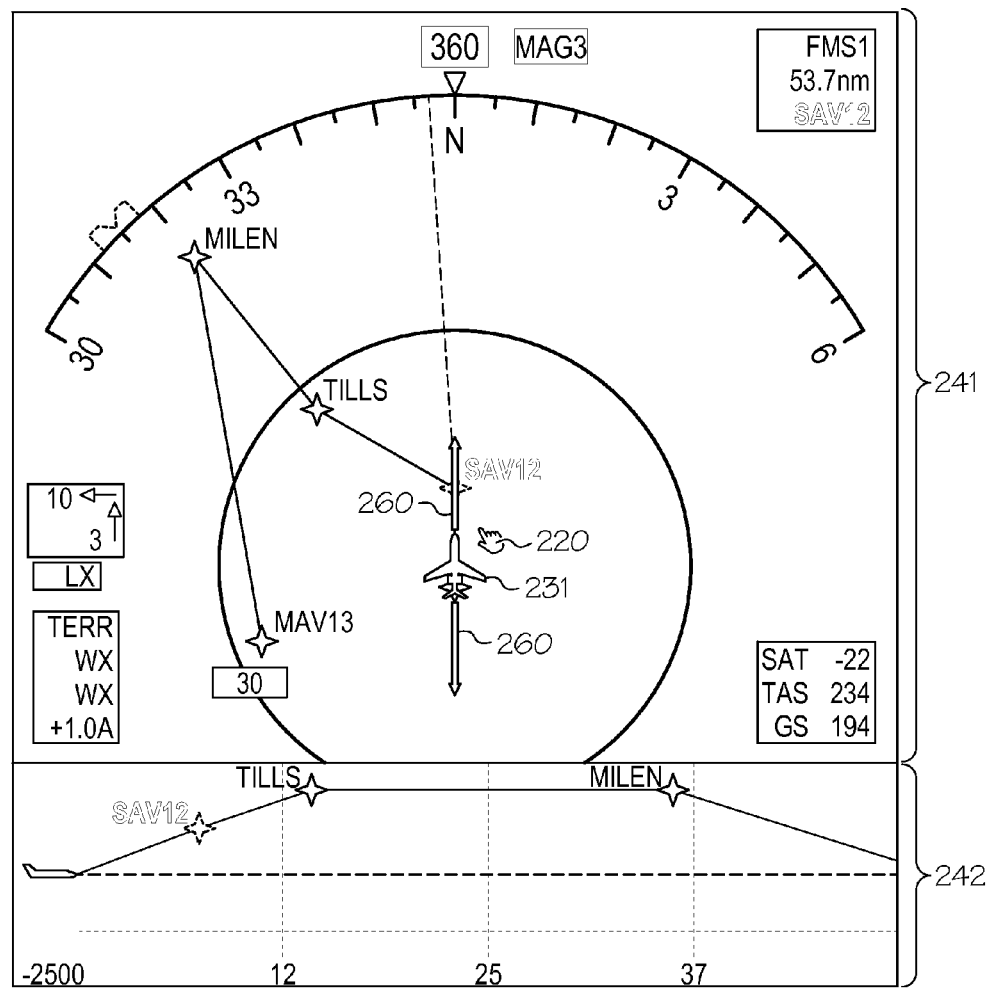

FIG. 5B illustrates an A/T functionality integrated into an INAV display in accordance with various embodiments of the present disclosure. As shown therein, the aircraft symbol 231 on the lateral navigation display 241 may be used as a virtual button in conjunction with the cursor control 220. Dragging the aircraft symbol 231 in the forward or reverse direction of the aircraft, as shown by the arrows 260, may be used to increase or decrease the speed target. The value of the increasing or decreasing speed target may be displayed against the airplane symbol 231.

Altitude Controls

Figure 6A:
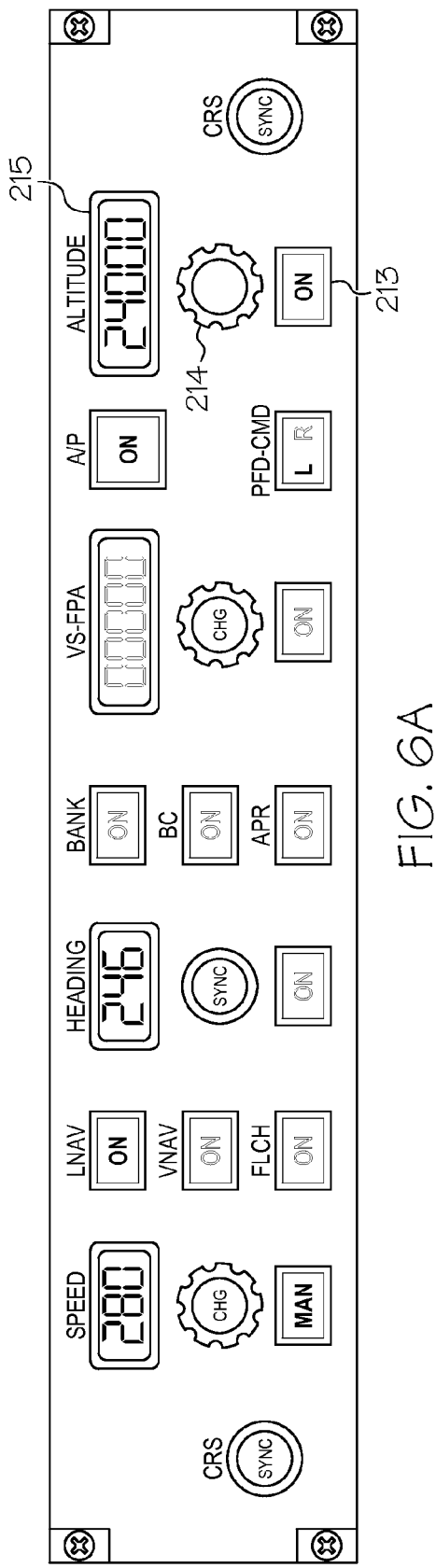
FIGS. 6A and 6B illustrate altitude control functionalities integrated into the flight display system shown in FIG. 1.

FIG. 6A illustrates a conventional mode control panel that includes an altitude control button 213, an altitude dial knob 214, and an altitude indicator window 215. Pushing the altitude control button 213 below the knob 214 engages the altitude hold (ALT HOLD) mode of the autopilot. The altitude dial knob 214 controls the preselect altitude displayed in the altitude indicator window 215 and on the PFD. When the ALT HOLD mode is engaged, the button annunciates on.

Figure 6B:
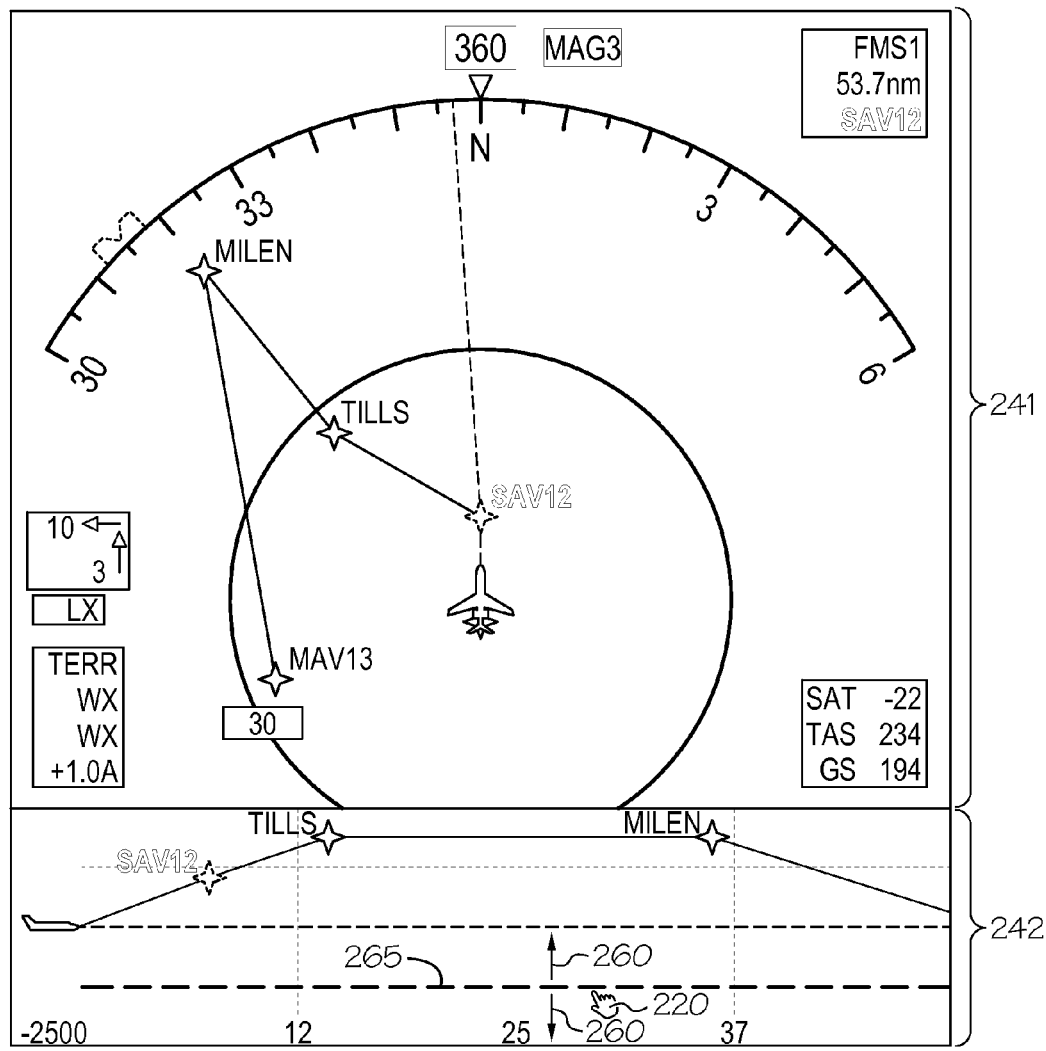

FIG. 6B illustrates an altitude control functionality integrated into an INAV display in accordance with various embodiments of the present disclosure. As shown therein, an altitude target indicator line 265 on the VNAV display 242 may be used as a virtual button in conjunction with the cursor control 200. Dragging the altitude target indicator line 265 up or down may be used to increase or decrease the altitude target, as shown by arrows 260. The value of increasing or decreasing altitude target may be displayed against the cursor 220. Once the desired altitude target is selected, pressing the altitude target line may cause the ALT HOLD mode to be selected. A brighter color for the altitude target indicator line may be used to indicate that the ALT HOLD mode is active, or any other suitable visual indication (e.g., a change in size, a change in shape, etc.).

Approach Mode and Back Course Mode Controls

Figure 7A:
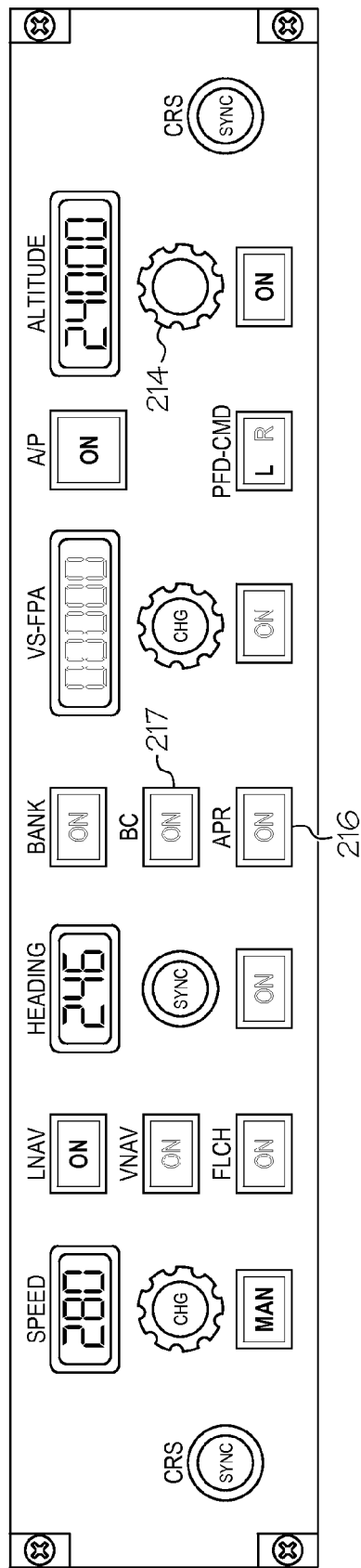
FIGS. 7A, 7B, and 7C illustrate approach and back course control functionalities integrated into the flight display system shown in FIG. 1.

FIG. 7A illustrates a conventional mode control panel that includes an approach (APR) control button 216 and a back course (BC) control button 217. The APR control button 216 is used to select and deselect the approach mode. It is used for microwave landing system (MLS), VOR, TCN, and ILS approaches. The approach mode is selected to arm ILS vertical path captures. When pushed, the BC control button 217 selects or deselects the ILS approach back course function and display. When BC is selected, the button annunciates on.

Figure 7B:
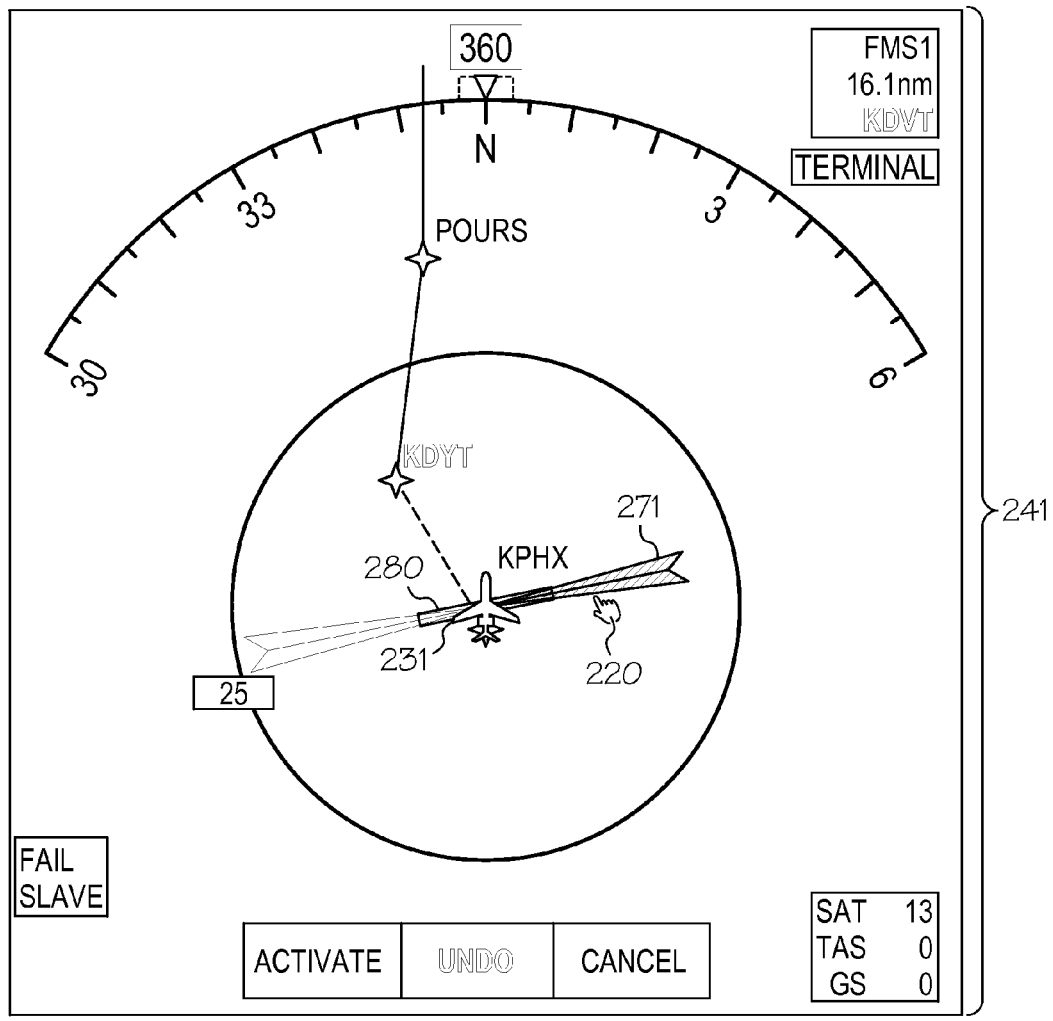
Figure 7C:
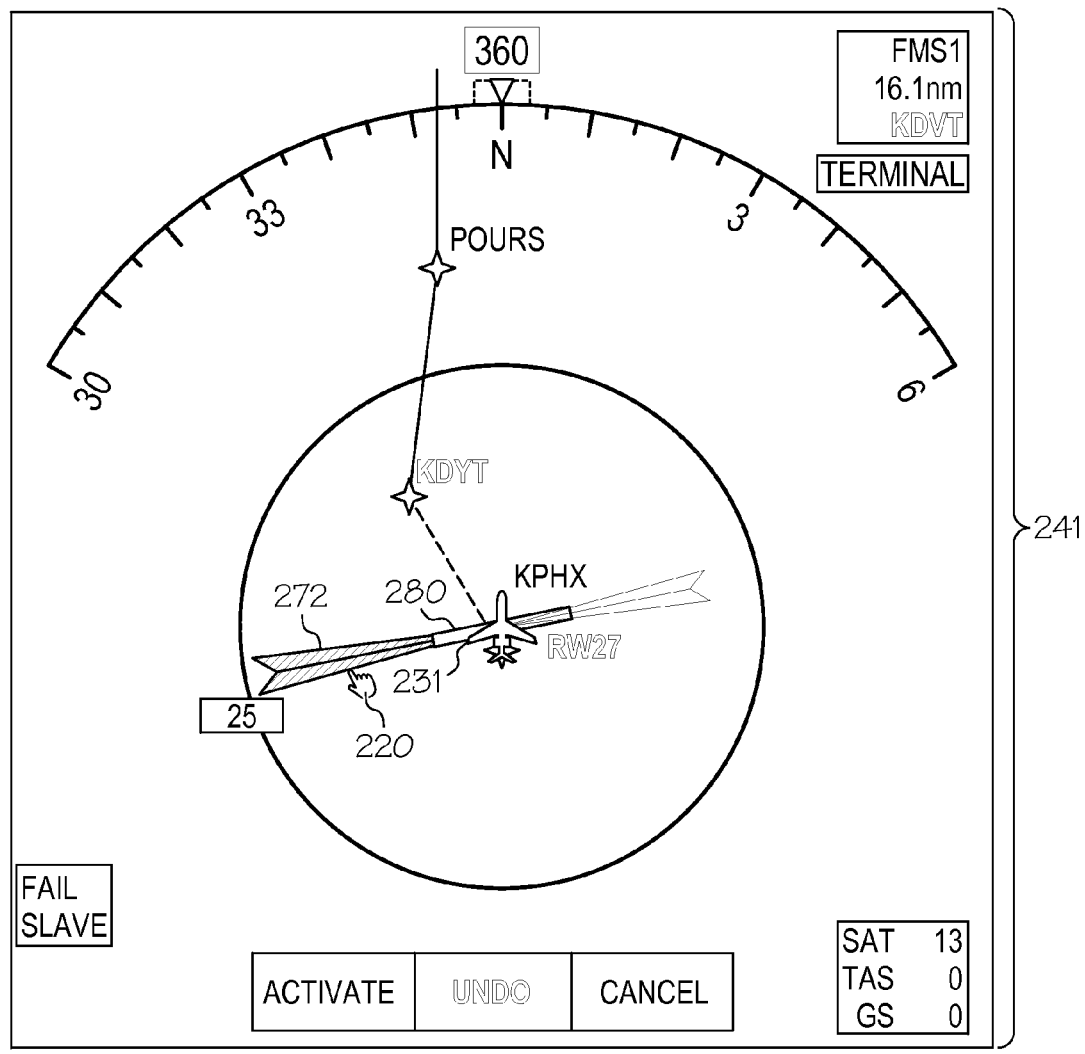

FIG. 7B illustrates an approach and back course control functionality integrated into an INAV display in accordance with various embodiments of the present disclosure. As shown therein, a localizer/glide slope (GS) symbol 271 displayed against the runway symbol 280 displayed on the LNAV display 241 can act as a virtual button in conjunction with a cursor control 220. Selecting the localizer/GS symbol may be used to enable the APR mode. A brighter color for the localizer/GS mode symbol 271 may be used to indicate that the APR mode is active, or any other suitable visual indication (e.g., a change in size, a change in shape, etc.). Further, as shown in FIG. 7C, a similar method may be used with localizer/GS symbol 272 in the opposite direction of the selected runway 280 to enable the BC mode.

As such, the present disclosure has set forth an improved flight display system with numerous benefits over the prior art. For example, the benefits of the presently described embodiments include the following: The user will be able to visualize and control the autopilot through the interactive navigation display itself without diverging himself/herself to additional panels. It provides a richer and easier user experience on touch screens. The controls are readily available on the nearest pilot interface through the interactive navigation display instead of the overhead glare shield. Further, it reduces the avionics onboard if all of the mode control panel and/or guidance panel operations are integrated with the interactive navigation display. Thus, the described embodiments provide improved user interactivity on various modes of pilot interaction with the flight control computers, which enhances the productivity of the pilot. It also allows the pilot to get an integrated view and perform operations without having to concentrate on multiple avionics in the cockpit.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A method for providing a display to a flight crew of an aircraft comprising the steps of: providing a horizontal navigation display comprising: data regarding the movement of the aircraft in a horizontal direction; a virtual compass comprising an aircraft heading indicator indicating a current heading of the aircraft and an autopilot heading selector; and an aircraft icon indicating a position of the aircraft in the horizontal direction; providing a vertical navigation display comprising: data regarding the movement of the aircraft in a vertical direction; an altitude target indicator line; and an aircraft icon indicating a position of the aircraft in the vertical direction, wherein the horizontal and vertical navigation displays are disposed adjacent to one another on a single display device; receiving a first input to the display device indicating a selection of the horizontal navigation display aircraft icon; in response to the selection of the horizontal navigation display aircraft icon, engaging a horizontal navigation control feature of an autopilot system of the aircraft; receiving a second input to the display device indicating a selection of the vertical navigation display aircraft icon; in response to the selection of the vertical navigation display aircraft icon, engaging a vertical navigation control feature of the autopilot system of the aircraft; receiving a third input to the display device indicating a selection of the autopilot heading selector, the third input comprising a movement of the autopilot heading selector along the virtual compass to a desired heading; in response to the movement of the autopilot heading selector, actuating a flight heading control system of the horizontal navigation control feature to cause the aircraft to fly at the desired heading; receiving a fourth input to the display device indicating a selection of the altitude target indicator line, the fourth input comprising a movement of the altitude target indicator line in either an up or a down vertical direction to indicate a desired altitude; and in response to the movement of the altitude target indicator line, actuating an altitude control system of the vertical navigation control feature to cause the aircraft to fly at the desired altitude; receiving a fifth input to the display device indicating a selection of the horizontal navigation display aircraft icon, the fifth input comprising a movement of the horizontal navigation display aircraft icon in either a forward or reverse horizontal direction to indicate a desired airspeed; and in response to the movement of the horizontal navigation display aircraft icon, actuating an autothrottle control system of the autopilot system of the aircraft to cause the aircraft to fly at the desired airspeed, wherein receiving one or more of the first, second, third, and fourth inputs comprises moving a cursor control device to overlay a respective one or more of the horizontal navigation display aircraft icon, vertical navigation display aircraft icon, the autopilot heading selector, and the altitude target indicator line.

2. The method of claim 1, further comprising receiving a fifth input to the display device indicating a selection of the aircraft heading indicator, and, in response to the selection of the aircraft heading indicator, moving the autopilot heading selector along the virtual compass to overlay the aircraft heading indicator, thereby actuating the flight heading control system of the horizontal navigation control feature to cause to aircraft to maintain flight along the current heading of the aircraft.

3. The method of claim 1, further comprising receiving a fifth input to the display device indicating a selection of the vertical navigation display aircraft icon, the fifth input comprising a movement of the vertical navigation display aircraft icon in either an up or a down vertical direction to indicate a desired vertical speed, and, in response to the movement of the vertical navigation display aircraft icon, actuating an altitude control system of the vertical navigation control feature to cause the aircraft to fly at the desired vertical speed.

4. The method of claim 1, further comprising receiving a fifth input to the display device indicating a selection of the vertical navigation display aircraft icon, the fifth input comprising a rotational movement of an arrow associated with the vertical navigation display aircraft icon in either an up or a down vertical direction, or a clockwise or anticlockwise direction, to indicate a desired flight path angle, and, in response to the rotational movement of the vertical navigation display aircraft icon, actuating an altitude control system of the vertical navigation control feature to cause the aircraft to fly at the desired flight path angle.

5. The method of claim 1, further comprising receiving a fifth input to the display device indicating a selection of an approach localizer icon for a desired runway approach, and, in response to the selection of the approach localizer icon, actuating the flight heading control system of the horizontal navigation control feature and the vertical navigation control feature to cause the aircraft to fly along the desired runway approach.

6. The method of claim 1, further comprising receiving a fifth input to the display device indicating a selection of a back course approach localizer icon for a desired runway approach, and, in response to the selection of the back course approach localizer icon, actuating the flight heading control system of the horizontal navigation control feature and the vertical navigation control feature to cause the aircraft to fly along the desired runway approach.

7. The method of claim 1, further comprising, in response to receiving a selection of one or more of the horizontal navigation display aircraft icon, vertical navigation display aircraft icon, the autopilot heading selector, and the altitude target indicator line, changing a color or a brightness of the respective one or more of the horizontal navigation display aircraft icon, vertical navigation display aircraft icon, the autopilot heading selector, and the altitude target indicator line.

8. The method of claim 1, wherein the horizontal navigation display further comprises one or more flight path waypoints.

9. A display system configured to provide a display to a flight crew of an aircraft comprising: an image display device; a cursor control device in operable electronic communication with the image display device a data storage device that stores navigation information and runway information; and a computer processor device in operable electronic communication with the image display device and the data storage device, wherein the computer processor device is configured to: provide a horizontal navigation display comprising: data regarding the movement of the aircraft in a horizontal direction; a virtual compass comprising an aircraft heading indicator indicating a current heading of the aircraft and an autopilot heading selector; and an aircraft icon indicating a position of the aircraft in the horizontal direction; provide a vertical navigation display comprising: data regarding the movement of the aircraft in a vertical direction; an altitude target indicator line; and an aircraft icon indicating a position of the aircraft in the vertical direction, wherein the horizontal and vertical navigation displays are disposed adjacent to one another on a single display device; receive a first input to the display device indicating a selection of the horizontal navigation display aircraft icon; in response to the selection of the horizontal navigation display aircraft icon, engage a horizontal navigation control feature of an autopilot system of the aircraft; receive a second input to the display device indicating a selection of the vertical navigation display aircraft icon; in response to the selection of the vertical navigation display aircraft icon, engage a vertical navigation control feature of the autopilot system of the aircraft; receive a third input to the display device indicating a selection of the autopilot heading selector, the third input comprising a movement of the autopilot heading selector along the virtual compass to a desired heading; in response to the movement of the autopilot heading selector, actuate a flight heading control system of the horizontal navigation control feature to cause the aircraft to fly at the desired heading; receive a fourth input to the display device indicating a selection of the altitude target indicator line, the fourth input comprising a movement of the altitude target indicator line in either an up or a down vertical direction to indicate a desired altitude; and in response to the movement of the altitude target indicator line, actuate an altitude control system of the vertical navigation control feature to cause the aircraft to fly at the desired altitude; receive a fifth input to the display device indicating a selection of the horizontal navigation display aircraft icon, the fifth input comprising a movement of the horizontal navigation display aircraft icon in either a forward or reverse horizontal direction to indicate a desired airspeed; and in response to the movement of the horizontal navigation display aircraft icon, actuate an auto-throttle control system of the autopilot system of the aircraft to cause the aircraft to fly at the desired airspeed, wherein the computer processor device being configured to receive one or more of the first, second, third, and fourth inputs comprises the computer processor device being configured to receive a movement of the cursor control device to overlay a respective one or more of the horizontal navigation display aircraft icon, vertical navigation display aircraft icon, the autopilot heading selector, and the altitude target indicator line.

10. The system of claim 9, wherein the computer processor device is further configured to receive a fifth input to the display device indicating a selection of the aircraft heading indicator, and, in response to the selection of the aircraft heading indicator, move the autopilot heading selector along the virtual compass to overlay the aircraft heading indicator, thereby actuating the flight heading control system of the horizontal navigation control feature to cause to aircraft to maintain flight along the current heading of the aircraft.

11. The system of claim 9, wherein the computer processor device is further configured to receive a fifth input to the display device indicating a selection of the vertical navigation display aircraft icon, the fifth input comprising a movement of the vertical navigation display aircraft icon in either an up or a down vertical direction to indicate a desired vertical speed, and, in response to the movement of the vertical navigation display aircraft icon, actuate an altitude control system of the vertical navigation control feature to cause the aircraft to fly at the desired vertical speed.

12. The system of claim 9, wherein the computer processor device is further configured to receive a fifth input to the display device indicating a selection of the vertical navigation display aircraft icon, the fifth input comprising a rotational movement of an arrow associated with the vertical navigation display aircraft icon in either an up or a down vertical direction, or a clockwise or anticlockwise direction, to indicate a desired flight path angle, and, in response to the rotational movement of the vertical navigation display aircraft icon, actuate an altitude control system of the vertical navigation control feature to cause the aircraft to fly at the desired flight path angle.

13. The system of claim 9, wherein the computer processor device is further configured to receive a fifth input to the display device indicating a selection of an approach localizer icon for a desired runway approach, and, in response to the selection of the approach localizer icon, actuate the flight heading control system of the horizontal navigation control feature and the vertical navigation control feature to cause the aircraft to fly along the desired runway approach.

14. The system of claim 9, wherein the computer processor device is further configured to receive a fifth input to the display device indicating a selection of a back course approach localizer icon for a desired runway approach, and, in response to the selection of the back course approach localizer icon, actuate the flight heading control system of the horizontal navigation control feature and the vertical navigation control feature to cause the aircraft to fly along the desired runway approach.

15. The system of claim 9, wherein the system excludes both a mode control panel and a guidance panel.

* * * * *